Dec. 12, 1950    A. W. FORMAN ET AL    2,533,448
MANDREL FOR BLIND RIVETING
Filed July 7, 1949
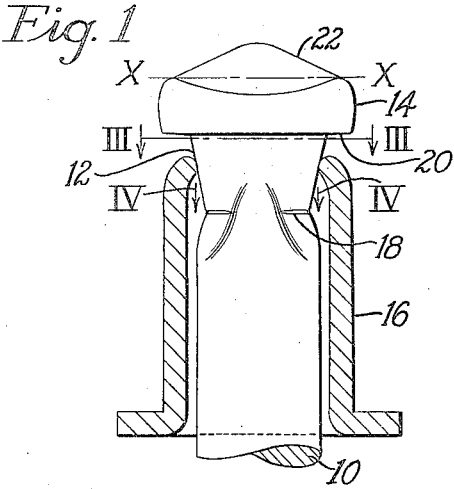
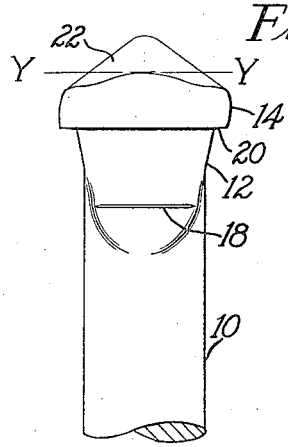
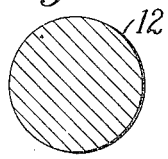
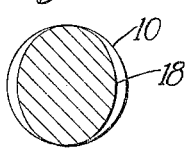
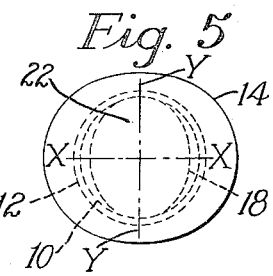
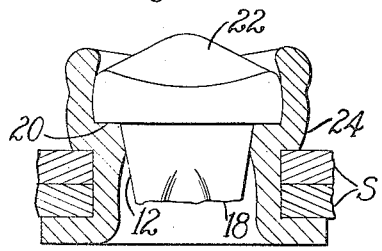
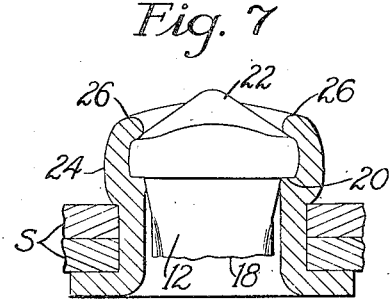
Inventors
Arthur W. Forman
Walter R. Thirdborough
By their Attorney Patented Dec. 12, 1950

2,533,448

UNITED STATES PATENT OFFICE 2,533,448

MANDREL FOR BLIND RIVETING

Arthur Walter Forman and Walter Redvers Thirdborough, Leicester, England, assignors to United Shoe Machinery Corporation, Flemington, N. J., a corporation of New Jersey Application July 7, 1949, Serial No. 103,378
In Great Britain September 11, 1948

2 Claims. (Cl. 85—40)

1

This invention relates to two-part rivets and aims more particularly to provide an improved mandril for that type of blind riveting in which a mandril stem is tensioned to upset a tubular rivet. This practice, sometimes referred to as "pop riveting," is disclosed in a copending application for U. S. Letters Patent, Serial No. 631,039, filed November 27, 1945, in the name of Basil P. Cooper and elsewhere. While the invention is hereinafter described and illustrated in connection with pop riveting, it will be appreciated that application of the invention is not necessarily so limited.

In pop riveting a flange-headed hollow rivet is received by a mandril with a head larger than the bore of the rivet but smaller than alined holes in the parts to be secured together. Then, while holding the rivet against the work, the mandril shank or stem is pulled so that its head lodges in one end of the rivet barrel. The characteristic peculiar to pop riveting is, as indicated in the copending application above cited, that after the rivet has been upset in this manner the mandril stem is further tensioned so as to be strained beyond its elastic limit and broken off, thereby normally leaving the mandril head and perhaps a portion of the stem as a plug in the set rivet. Advantages commonly derived from the pop riveting procedure comprise elimination of the usually unwanted hollow in the rivet and provision of a non-leaking joint as well as one that affords increased resistance to shearing stress.

To insure continuance of the above and other benefits of pop riveting (especially if there is to be less critical dependence on the condition of the rivet metal) considerable technique must be employed to prevent the head and shank portions of mandrils from being ejected, loosened or dislodged from their respective rivets as a result of the initial installation shock or subsequent vibrations and wear. Modifications in rivet and mandril assemblages have previously been proposed the better to retain the mandril head, and some success has been achieved with a flat, ovalized mandril head, for example one of the form and manufacture set forth in British Patent No. 504,928. As noted therein, and in United States Letters Patent No. 2,086,218 granted to W. Eckold, for example, a certain amount of mandril head retention can be effected by reason of the curling imparted to a rivet end during mandril installation.

In view of the above a principal object of the present invention is to provide an improved

2 mandril head for riveting, the use of which will provide better sealing and locking of its head portion within a tubular rivet while the latter firmly secures riveted parts together.

In accordance with this object a feature of the invention resides in providing a mandril with a novel head configuration having an ellipticity adapted to act upon an end of the tubular rivet being set thereby so as to induce a localized flow of mandril locking material.

The term "oval" as hereinafter used in intended to include geometrical shapes which are elliptical and also those of other non-circular configurations which may be regarded as having major and minor axes.

The above and other features of the invention will now be described in detail with reference to the accompanying drawings, in which, Fig. 1 is an elevation of a head end portion of one form of mandril illustrative of the invention and having its associated rivet in vertical section;

Fig. 2 is an elevation of the mandril shown in Fig. 1 when turned 90° about a vertical axis;

Fig. 3 is a view in section taken on the line III—III of Fig. 1;

Fig. 4 is a view in section taken on the line IV—IV of Fig. 1;

Fig. 5 is a plan view of the mandril shown as viewed in Fig. 1;

Fig. 6 shows the mandril and rivet of Fig. 1 after installation in a structure; and Fig. 7 is an elevation corresponding to Fig. 6 but turned 90° about a vertical axis.

The mandril has the general form of a nail and is comprised of a cylindrical wire-like shank or body 10 (Figs. 1 and 2) having a tapered neck portion 12 that extends to a cap or upsetting head 14. The head and neck portions are preferably integral with the body 10, being formed by power-operated dies operating on a length of wire. The mandril is less ductile than a tubular rivet 16 with which it is to cooperate in telescopic movement. Mandrils formed of medium carbon steel wire having a diameter of approximately $\frac{1}{10}$ of an inch and a tensile strength of 60 to 70 tons per square inch have, for example, proved satisfactory in making many rivet settings.

The neck portion 12 of the mandril has had its frangibility increased at a selected locality by providing a reduced diameter as at 18. The diameter of the neck portion gradually increases from the constriction at 18 and toward a flat face 20 extending transversely of the mandril. This tapered mandril neck is lightly wedged into annular engagement with a rivet end and thus conveniently affords means for initially holding the unset rivet and mandril in assembled relation.

While the face 20 constitutes the base of the head 14 and has an elliptical perimeter (Fig. 5), its locus of intersection with the neck portion 12 is circular (Fig. 3). Transverse sections of the head 14 taken in planes parallel to the face 20, i. e. normal to the mandril, are oval. Moreover, such sections are of like configuration near the base of the head. But it will be seen that the head 14 is provided with a smooth and particular form of conical exterior 22. The oval transverse sections in this portion 22 become smaller toward the head end of the mandril. As regards these diminishing oval sections, it may be considered that the extremities of their major axes form the conical head outline of Fig. 1 while the termini of the corresponding minor axes form the conical head outline in Fig. 2. It will be noted that this conical surface 22 is of greater acclivity when viewed in Fig. 2 than when viewed in Fig. 1. This is to say that the ellipticity of the head is such as to provide a diametrical thickness which is substantially greater at the extremities of the major axes (such as at X—X, Fig. 1) for example, than at the extremities of corresponding minor axes (as at Y—Y, Fig. 2).

When installing the rivet 16 its flanged accessible end is normally held stationary and in engagement with the front of the structure S by the riveting tool while the mandril stem 10 is retracted. Pulling the mandril head 22 into the bore of the rivet results initially in the endwise collapsing of the rivet barrel to form a bulged flange 24 (Figs. 6 and 7) which is in tight fitting engagement with the mandril head 22. As the head moves inwardly of the rivet barrel the end of the latter is induced to roll inwardly upon itself and so to seal in the mandril head. The face 20 compacts rivet material between the neck 12 and the structure S. Presumably, the desired lapping of the rivet material over the oval mandril head is due both to the lesser side thickness of the latter than end thickness (measured lengthwise of the mandril) and to the peculiar conical form of the head, and is facilitated by the circumferential tensioning effected in the ductile rivet material. The lesser diametric thickness along the minor axes, (as Y, Y) than along the major axes (as X, X) of the head results in the rivet barrel behaving elastically and curling inwardly to a greater extent on the opposite sides of the head having most acclivity and lesser in height, especially at 26, 26, Fig. 7.

When the head 22 ceases movement inwardly of the rivet, the tool tension increases to strain and break off the mandril stem at the constriction 18 and the head 22 is left securely held as a permanent plug in the rivet.

Having thus described our invention, what we claim as new and desire to secure by Letters Patent of the United States is:

1. A two-part rivet comprised of a tubular member of ductile material and a less ductile mandril in telescopic relation, the mandril having a smooth cone-shaped upsetting head outside the tubular member and larger than the bore thereof, the upsetting head of said mandril being oval in sections perpendicular to the latter and the thickness, measured lengthwise of the mandril, being less along the sides of said head than at its ends.

2. A mandril for installing a tubular rivet, comprising a stem having a constriction therein, a neck portion extending from the stem constriction, and a smooth-surfaced upsetting head integral with the neck portion and having a generally cone-shaped cap, said head being of oval section with major and minor axes extending in planes perpendicular to the length of the stem and having greater head thickness, measuring from the neck portion lengthwise of the stem, at opposite sides adjacent to termini of the major axes than at the ends adjacent to termini of the minor axes, whereby rivet curling is more readily induced at the head ends.

ARTHUR WALTER FORMAN.
WALTER REDVERS THIRDBOROUGH.

No references cited.